(12) United States Patent
Hsu

(10) Patent No.: US 6,663,403 B2
(45) Date of Patent: Dec. 16, 2003

(54) ELECTRICAL CARD CONNECTOR HAVING POLARIZATION MECHANISM

(75) Inventor: Hugh Chi Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 17 days.

(21) Appl. No.: 10/135,253

(22) Filed: Apr. 29, 2002

(65) Prior Publication Data
US 2003/0082939 A1 May 1, 2003

(30) Foreign Application Priority Data
Oct. 26, 2001 (TW) .................................. 90218393 U

(51) Int. Cl.⁷ .............................................. H01R 13/62
(52) U.S. Cl. ...................................... 439/159; 439/157
(58) Field of Search ................................ 439/152–160, 439/372, 259, 633, 946, 328, 341, 680, 607, 630

(56) References Cited

U.S. PATENT DOCUMENTS

| 5,421,737 A | * | 6/1995 | Chen et al. ................. 439/157 |
| 5,456,610 A | * | 10/1995 | Banakis et al. ............. 439/157 |
| 5,533,906 A | * | 7/1996 | Abe ........................... 439/159 |
| 6,068,516 A | * | 5/2000 | Chang ........................ 439/633 |
| 6,120,309 A | * | 9/2000 | Hara .......................... 439/159 |
| 6,361,339 B1 | * | 3/2002 | Zhang et al. ............... 439/160 |

* cited by examiner

*Primary Examiner*—Jean F. Duverne
(74) *Attorney, Agent, or Firm*—Wei Te Chung

(57) ABSTRACT

An electrical card connector (7) includes a shell (1), an insulative body (2), a plurality of contacts (3) mounted in the insulative body, an ejection mechanism (4) and a polarization mechanism (5). The shell covers the insulative body and the contacts. The ejection mechanism is mounted in the insulative body, and includes a slide block (40). The polarization mechanism includes a guiding groove (16) defined in the shell and an elastic piece (50) attached to the slide block. The elastic piece has an engaging portion (504) and a blocking portion (506). The guiding groove forms a blocking edge (166) to catch on the blocking portion. A correctly inserted card accepts the engaging portion in the card's notch (60), whereas an incorrectly inserted card pushes the blocking portion into the blocking edge of the guiding groove.

10 Claims, 5 Drawing Sheets

ELECTRICAL CARD CONNECTOR HAVING POLARIZATION MECHANISM

BACKGROUND OF THE INVENTION

1. Field of the Invention

The present invention relates to electrical card connectors for electrically connecting electrical cards with printed circuit boards, and particularly to card connectors having polarization mechanisms to prevent cards from being incorrectly inserted into the card connectors.

2. Related Art

With ongoing developments in electronics and communications, more and more electrical cards are being designed to satisfy all kinds of needs. As a result, different kinds of electrical card connectors are being developed. Most card connectors have a polarization mechanism to ensure that a card is correctly inserted into the card connector. If the card is incorrectly inserted, the polarization mechanism prevents the card from being fully inserted.

Conventionally, a bevel is formed on an electrical card, and a corresponding electrical card connector has a ramp portion matching the bevel. When the card is inserted into the connector, the bevel must mate with the ramp; otherwise, the ramp prevents full insertion of the card. A pertinent card connector is disclosed in Japanese Patent Application No. 11-66247 by Kokai.

The polarization mechanism of the Kokai patent application can prevent a card from being improperly inserted. However, damage to the contacts of the connector may occur, because a front edge of a wrongly inserted card can press against the contacts. Moreover, forcible improper insertion can easily damage the card.

Accordingly, an electrical connector with an improved polarization mechanism which can prevent the front edge of an improperly inserted card from damaging the contacts is desired.

SUMMARY OF THE INVENTION

An object of the present invention is to provide an electrical card connector which ensures that an electrical card can be inserted thereinto correctly and safely.

To achieve the above object, an electrical card connector in accordance with a preferred embodiment of the present invention includes a shell, an insulative body, a plurality of contacts mounted in the insulative body, an ejection mechanism and a polarization mechanism. The shell covers the insulative body and the contacts. The ejection mechanism is mounted in the insulative body, and includes a slide block. The polarization mechanism includes a guiding groove defined in the shell and an elastic piece attached to the slide block. The elastic piece has an arcuate engaging portion and a blocking portion. The guiding groove forms a blocking edge to abut against the blocking portion, thereby preventing rearward movement of the slide block when a card is incorrectly inserted. When the mating card with a notch cut in at a side thereof is correctly inserted into the connector, the notch receives the engaging portion therein, allowing the blocking portion to move out of alignment with the blocking edge, so that the card can be fully inserted into the connector successfully. When the card is incorrectly inserted into the connector, the blocking portion is blocked by the blocking edge.

These and additional objects, features and advantages of the present invention will become apparent after reading the following detailed description of a preferred embodiment of the invention taken in conjunction with the appended drawings.

BRIEF DESCRIPTION OF THE INVENTION

DETAILED DESCRIPTION OF THE INVENTION

Figure 1:
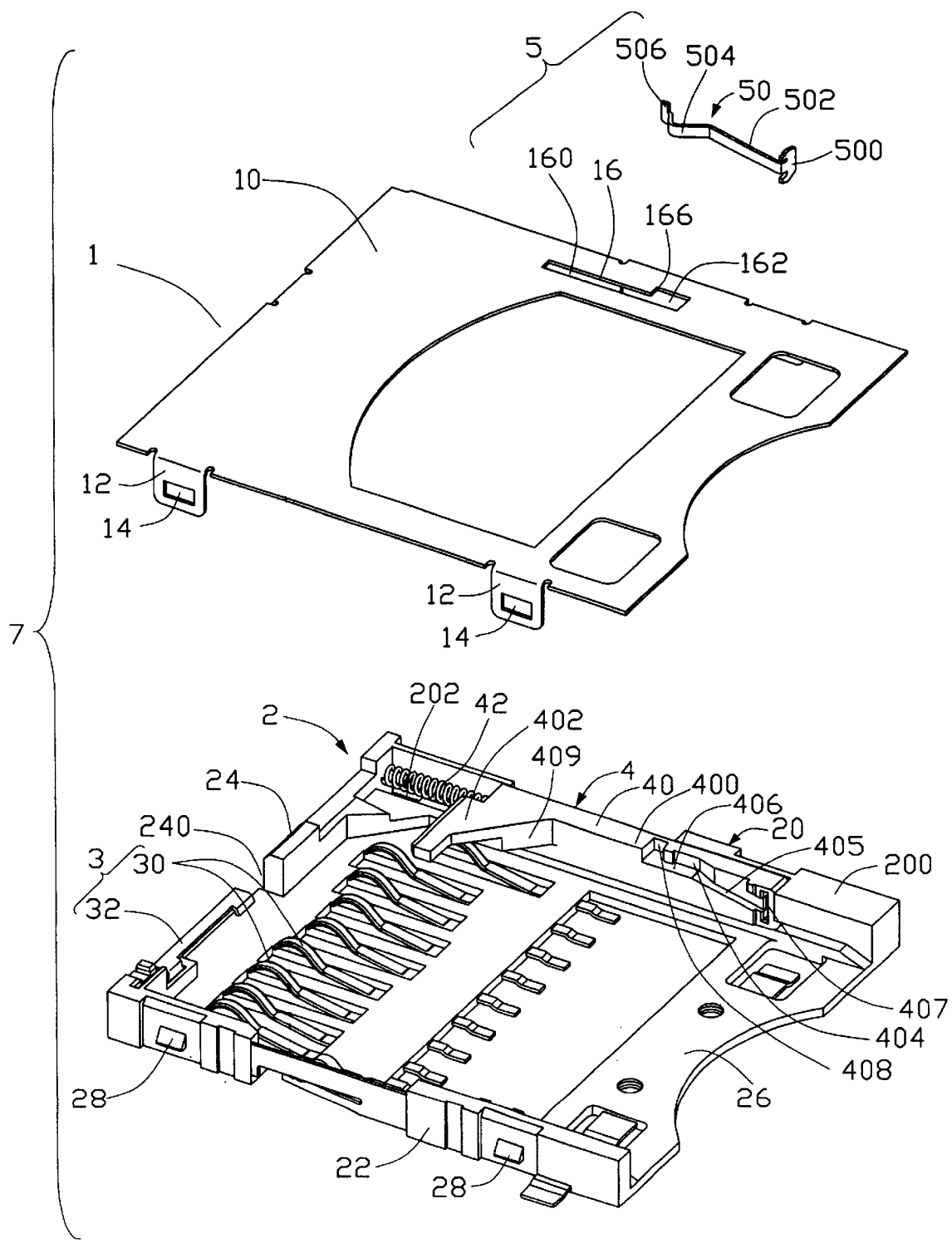
FIG. 1 is an exploded, perspective view of an electrical card connector according to the present invention.

Referring to FIG. 1, an electrical card connector 7 in accordance with a preferred embodiment of the present invention includes a shell 1, an insulative body 2, a plurality of contacts 3, an ejection mechanism 4 and a polarization mechanism 5.

The shell 1, which can be made of a conductive material, includes a top wall 10 and a plurality of sidewalls 12 bent perpendicularly downwardly from edges of the top wall 10. A guiding groove 16 is defined in the top wall 10. The guiding groove 16 is L-shaped, and forms a longitudinal groove 160 and a transverse groove 162 connecting with a front end of the longitudinal groove 160. A blocking edge 166 is formed adjacent a junction of the longitudinal groove 160 and the transverse groove 162. A retaining hole 14 is defined in each sidewall 12.

The insulative body 2 includes a header 24, a first arm 20, a second arm 22 and a bottom wall 26. The header 24, the first arm 20 and the second arm 22 all project upwardly from the bottom wall 26. The first arm 20 and the second arm 22 perpendicularly extend from opposite sides of the header 24 respectively. The first arm 20 has a blocking piece 200 at a front end thereof and forms a slide groove 202 therein to facilitate stable sliding of the ejection mechanism 4 along the first arm 20. The header 24 defines an opening 240 therein proximate the second arm 22. A plurality of fastenings 28 projects from outer surfaces of the header 24, the first arm 20 and the second arm 22, to engage with the retaining holes 14 of the shell 1.

The contacts 3 include a plurality of touch contacts 30 and a detecting contact 32. The touch contacts 30 are mounted in the bottom wall 26 and match with pads (not shown) of an inserted mating electrical card 6 (see FIGS. 2 and 3). The detecting contact 32 is received in the opening 240.

The ejection mechanism 4 is in moveable contact with the first arm 20 and can slide in the slide groove 202. The ejection mechanism 4 includes a slide block 40, a coil spring 42 and a connecting rod (not shown) for positioning the ejection mechanism 4. The coil spring 42 is interposed between the header 24 and the slide block 40. Since the ejection mechanism 4 disclosed in the embodiment is well known by those skilled in the art, a detailed description thereof is omitted here.

The slide block 40 is moveably positioned against the first arm 20 between the coil spring 42 and the blocking piece 200. The slide block 40 includes an elongate supporting arm 400 and a triangle shaped interfering block 402. A front end of the supporting arm 400 is blocked in its forward movement by the blocking piece 200. A positioning hole 407 is defined in an inner surface of the front end of the supporting arm 400. A receiving groove 404 is defined in inner and upper surfaces of the supporting arm 400, extending rearwardly from and being in communication with the positioning hole 407. An inclined surface 405 and a horizontal surface 406 define a lower boundary of the receiving groove 404. An engaging groove 408 is defined in the supporting arm 400 in communication with the receiving groove 404.

Figure 2:
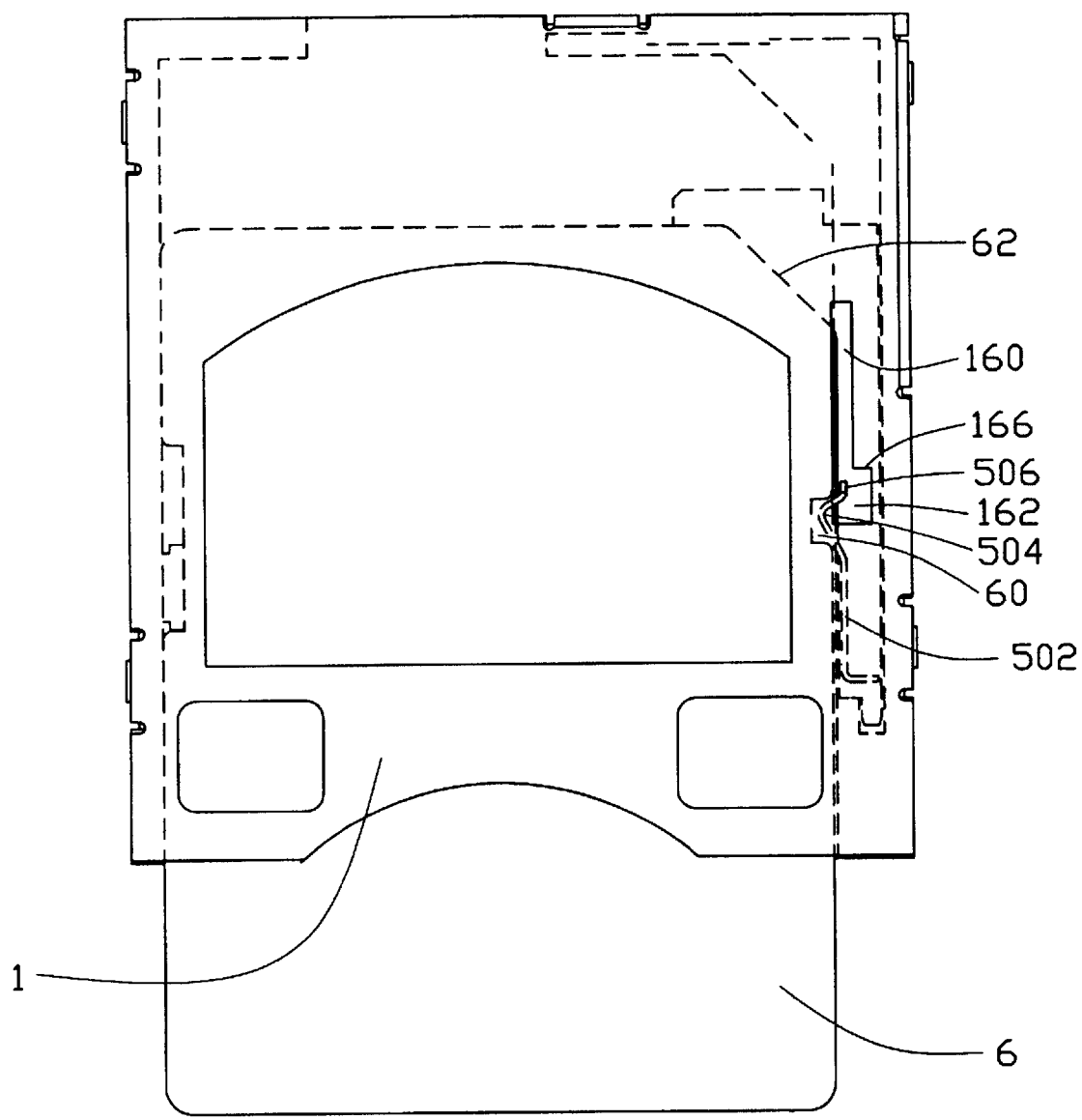
FIG. 2 is a top view of the assembled connector of FIG. 1, showing an electrical card being correctly inserted into the electrical card connector.
Figure 3:
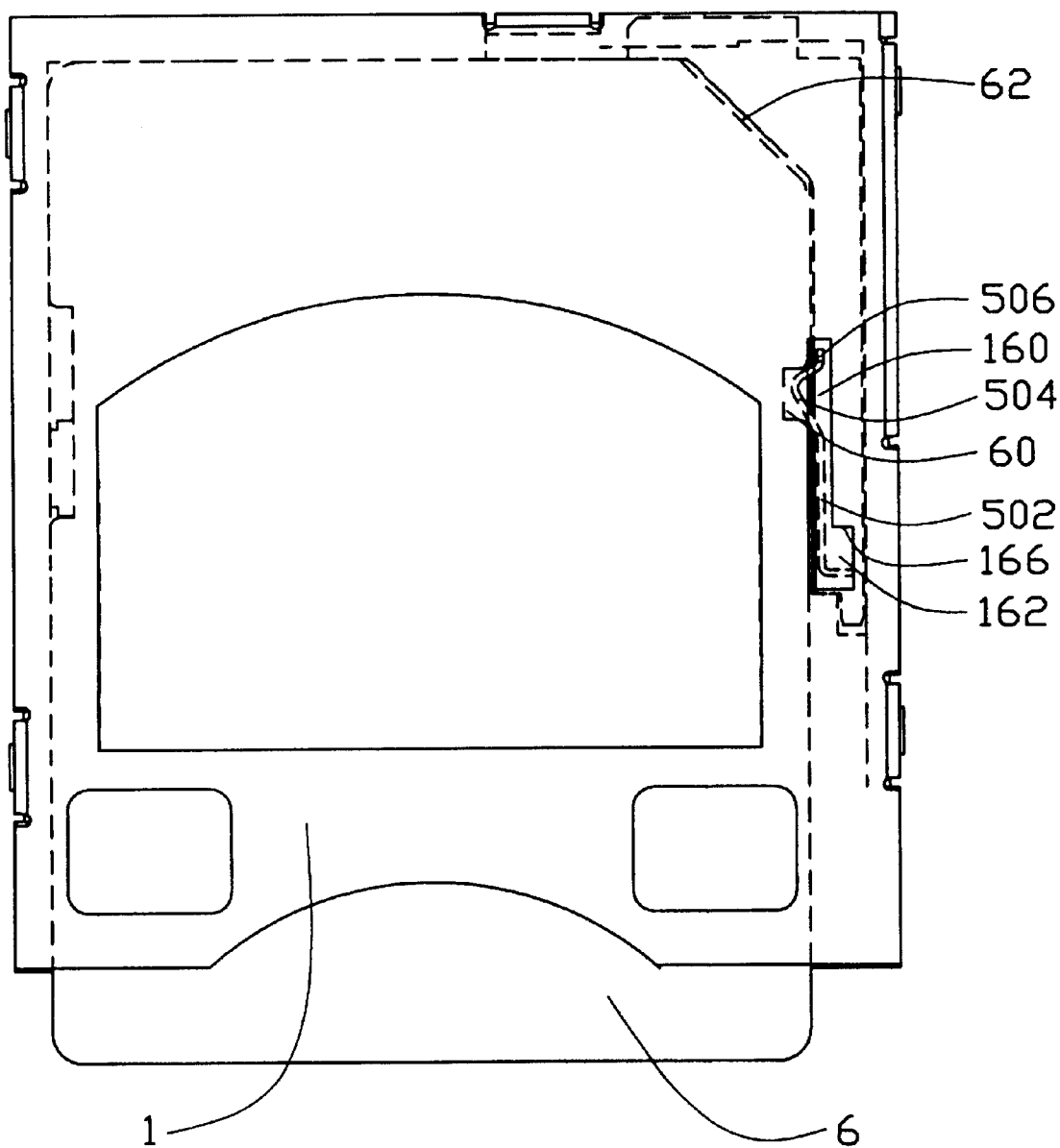
FIG. 3 is similar to FIG. 2, but showing the electrical card fully inserted in the electrical card connector of FIG. 1.

The interfering block 402 protrudes inwardly and perpendicularly from a rearward end of the supporting arm 400, and has a bevel face 409 at a forward side thereof which matches with a bevel 62 of the mating electrical card 6 (see FIGS. 2 and 3).

The polarization mechanism 5 includes the guiding groove 16 defined in the top wall 10 of the shell 1 and an elastic piece 50. The elastic piece 50 has a fixing portion 500 and an elongate elastic arm 502. The elastic arm 502 has an arcuate engaging portion 504 toward a rearward end thereof and a blocking portion 506 at a rearward end thereof. The blocking portion 506 protrudes above the rest of the elastic arm 502. The fixing portion 500 is bent from a front end of the elastic arm 502 to engage with the positioning hole 407. The elastic arm 502 has an inclination to match the inclination of the inclined surface 405.

Referring FIGS. 1 and 2, in assembly, the elastic piece 50 is mounted on the slide block 40 of the ejection mechanism 4, the fixing portion 500 of the elastic piece 50 being inserted into the positioning hole 407 of the supporting arm 400, locking the elastic piece 50 to the slide block 40. The elastic arm 502 is received in the receiving groove 404 of the supporting arm 400. The coil spring 42 is assembled to the header 24 and the slide block 40 is slideably engaged in the slide groove 202 between the coil spring 42 and the blocking piece 200, with the arcuate engaging portion 504 of the elastic piece 50 extending toward an inside of the insulative body 2. The detecting contact 32 is attached to the header 24.

The shell 1 is then engaged to the insulative body 2, the retaining holes 14 of the sidewalls 12 engaging with the fastenings 28 of the body 2, and the blocking portion 506 of the elastic piece 50 protruding through the transverse groove 162 to extend above an upper surface of the top wall 10 of the shell 1. Note that when no card 6 is present into the electrical card connector 7, the elastic arm 50 is biased inward toward the inside of the body 2, but is moveable under an outward force to a position where the blocking portion 506 is in the engaging groove 408.

FIG. 2 shows the mating electrical card 6 being correctly inserted into the card connector 7. In addition to the bevel 62 at a front corner, the card 6 has a notch 60 at a side of the card 6. In this embodiment, the notch 60 is in a lateral side of the card at a position corresponding to the position of the engaging portion 504 when the bevel 62 of the card 6 abuts the interfering block 402 of the slide block 40. When the card 6 is correctly inserted into the connector 7, the card initially presses the elastic piece 50 outwardly so that the blocking portion 506 is pushed into the engaging groove 408 and into the transverse groove 162 of the shell 1. As the card 6 is pushed in further, the bevel 62 abuts the bevel face 409 and the notch 60 receives the engaging portion 504 of the elastic piece 50 therein, as the elastic piece springs inwardly toward the inside of the insulative body. Thus, the blocking portion 506 moves inwardly, into alignment with the longitudinal groove 160, so that further movement of the card 6 into the connector 7 moves the slide block 40 with the elastic piece 50 rearward in the slide groove 202 along the first arm 20, the blocking portion 506 sliding rearwardly in the longitudinal groove 160, until the card 6 is fully inserted into the connector 7. FIG. 3 shows the card 6 fully inserted in the connector 7.

Figure 4:
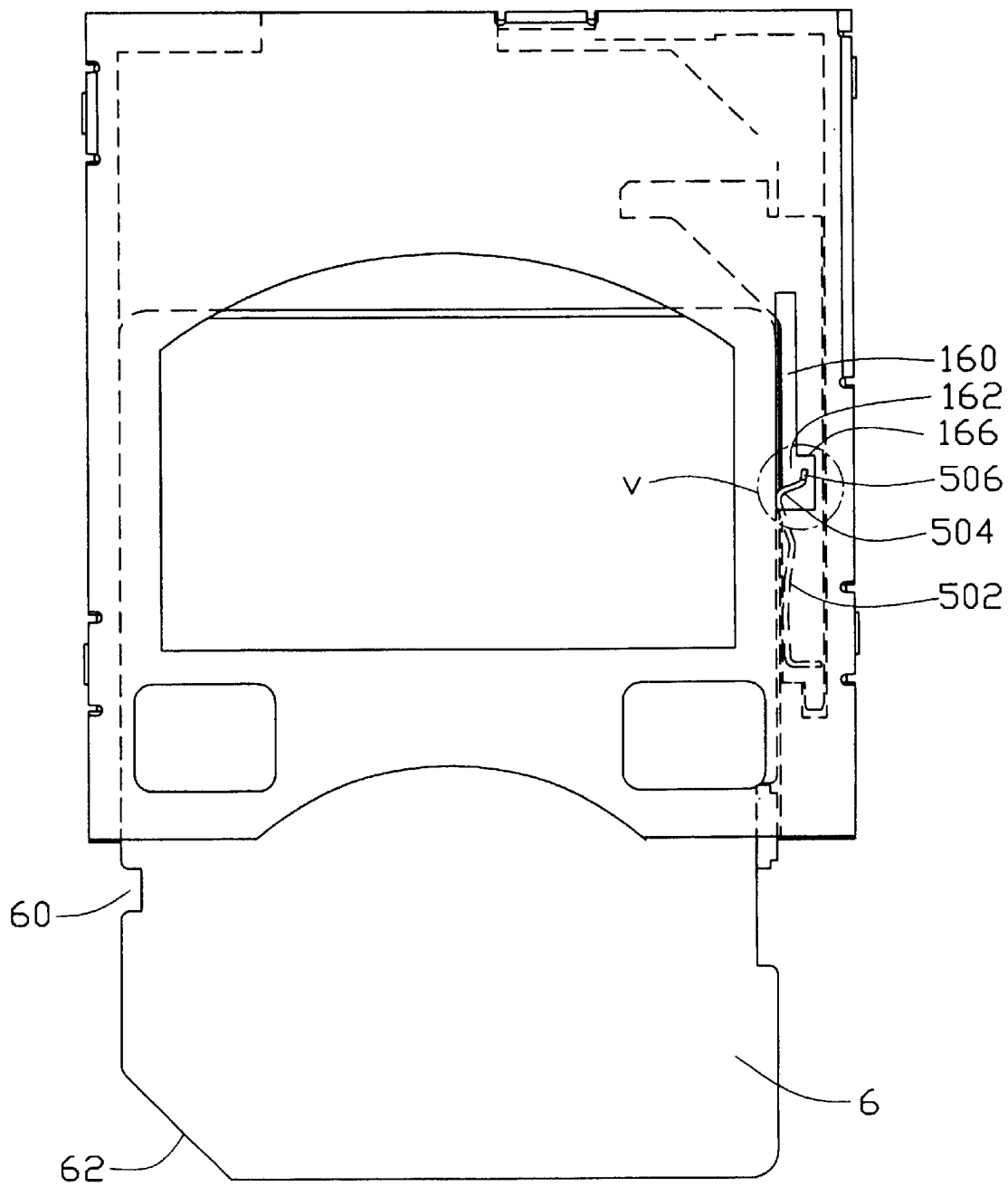
FIG. 4 is similar to FIG. 2, but showing an electrical card being incorrectly inserted into the electrical card connector.
Figure 5:
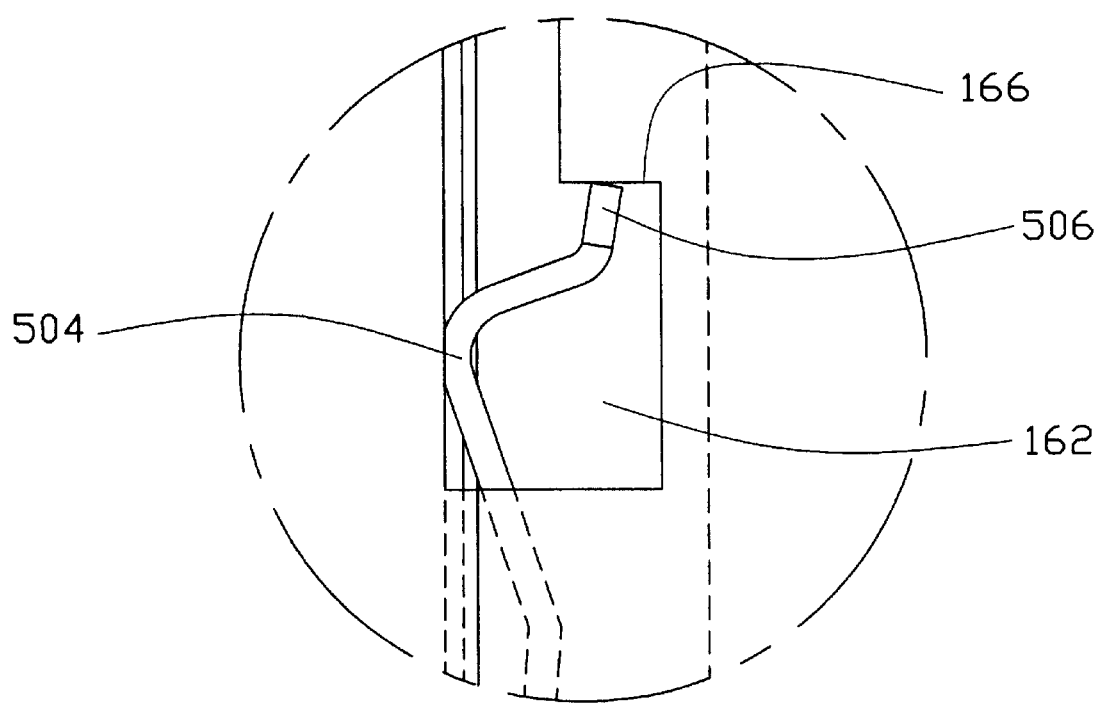
FIG. 5 is an enlarged view of that portion of FIG. 4 encircled by the line V.

Referring to FIGS. 4 and 5, when the card 6 is incorrectly inserted into the connector 7, a lateral side of the card 6, without the notch at the correct position, presses the elastic piece 50 outward, so that the blocking portion 506 is pressed into the engaging groove 408 and catches on the blocking edge 166, preventing further rearward movement of the slide block 40. Then the card 6 is prevented from moving in and possibly damaging the touch contacts 30 of the electrical card connector 7.

Although the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. An electrical card connector adapted to receive an electrical card having a void in a lateral side thereof, the connector comprising:

an insulative body;

a plurality of contacts mounted in the insulative body;

a shell covering the insulative body and the contacts, thereby defining a receiving space to receive the card;

a slide block moveably mounted on a sidewall of the insulative body; and a polarization mechanism including a guiding groove defined in the shell and an elastic piece attached to the slide block, the elastic piece having an engaging portion extending towards an inside of the receiving space and a blocking portion protruding out of the shell from the guiding groove, the guiding groove forming a blocking edge to interfere with the blocking portion; wherein when the card is correctly inserted into the connector, the void receives the engaging portion therein, and the blocking portion is not blocked by the blocking edge; when the card is wrongly inserted into the connector, a lateral side of the card without a void in a matching position presses the engaging portion outwards so that the blocking portion is blocked by the blocking edge; wherein the engaging portion and the blocking portion are parts of an elastic arm, and a fixing portion bends from a front end of the elastic arm, and the slide block defines a positioning hole to engage the fixing portion therein; wherein the slide block further defines a receiving groove to receive the elastic arm of the elastic piece; wherein the receiving groove communicates with an engaging groove defined in the slide block to receive the blocking portion of the elastic piece when the card is incorrectly inserted into the connector.

2. The electrical card connector as claimed in claim 1, wherein the guiding groove is L-shaped and includes a longitudinal groove and a transverse groove connecting with a front end of the longitudinal groove, and the blocking edge is formed adjacent the junction of the longitudinal groove and the transverse groove.

3. The electrical card connector as claimed in claim 2, wherein when the card is correctly inserted into the connector, the void of the card receives the engaging portion therein so that the blocking portion of the elastic piece slides in the longitudinal groove.

4. The electrical card connector as claimed in claim 2, wherein the guiding groove is formed in a top wall of the shell and the blocking portion protrudes out of the top wall from the guiding groove.

5. The electrical card connector as claimed in claim 2, wherein the guiding groove is formed in a side wall of the shell and the blocking portion protrudes out of the side wall from the guiding groove.

6. The electrical card connector as claimed in claim 1, wherein the engaging portion is arcuate.

7. A connector adapted to receive a card having a void in a side thereof, the connector comprising:
   a housing comprising:
      an insulative body;
      a plurality of contacts mounted in the insulative body; and
      a shell covering the insulative body and the contacts, thereby defining a receiving space to receive the card; and
      a polarization mechanism arranged within the housing, the polarization mechanism including a guiding groove defined in the housing and an elastic piece attached to the housing, the elastic piece having an engaging portion extending towards an inside of the receiving space and a blocking portion engaging with the guiding groove, the guiding groove forming a blocking edge to interfere with the blocking portion; wherein
         when the card is correctly inserted into the connector, the void receives the engaging portion therein, and the blocking portion is not blocked by the blocking edge; when the card is wrongly inserted into the connector, a side of the card without a void in a matching position presses the engaging portion outwards so that the blocking portion is blocked by the blocking edge; wherein
         the housing further includes a slide block moveably mounted on the insulative body, and the engaging portion and the blocking portion are parts of an elastic arm, and the elastic arm is mounted on the slide block; wherein
         the guiding groove is defined in the shell, and the blocking portion protrudes out of the shell from the guiding groove.

8. An electrical card connector assembly for preventing incorrect insertion of an electronic card, comprising:
   an insulative body;
   a plurality of contacts disposed in the insulative body;
   a shield fixedly mounted on the insulative body;
   a sliding block moveable relative to the insulative body and regularly located in a rear position relative to the insulative body for being ready for insertion of the electronic card;
   an elastic piece moved along with said sliding block, said elastic piece including an engaging portion and a blocking portion; and
   an electronic card including a notch therein; wherein
      when said electronic card is inserted into the insulative body correctly, the elastic piece is deflected less or none in an inner position to have the engaging portion received in the notch and the blocking portion will not interfere with either the insulative body or the shield so that the sliding block is able to be forwardly moved along with the forwardly inserted electronic card; when the electronic card is inserted into the insulative body incorrectly, the engaging portion is not received in the notch and is outwardly deflected significantly to have the blocking portion located in an outer portion and will interfere with at least one of the insulative body and the shield if said sliding block is further moved forwardly by said incorrectly inserted card; wherein
      said shield defines an elongated slot along a front-to-back direction to allow the blocking portion to move therealong without interference when said electronic card is inserted into the insulative body correctly and the elastic piece is accordingly located in the inner position.

9. The assembly as claimed in claim 8, wherein said blocking portion will interfere with the shield when the electronic card is inserted into the insulative body incorrectly and pushes the sliding block forwardly.

10. The assembly as claimed in claim 8, wherein said shield defines a transverse groove with a blocking edge thereabouts to allow the blocking portion to be received therein while preventing sliding block from forwardly moving when said electronic card is incorrectly inserted into the insulative body.

* * * * *